March 8, 1949.   G. A. SWENSON   2,464,103
STONE MANIPULATING IMPLEMENT
Filed Dec. 17, 1946
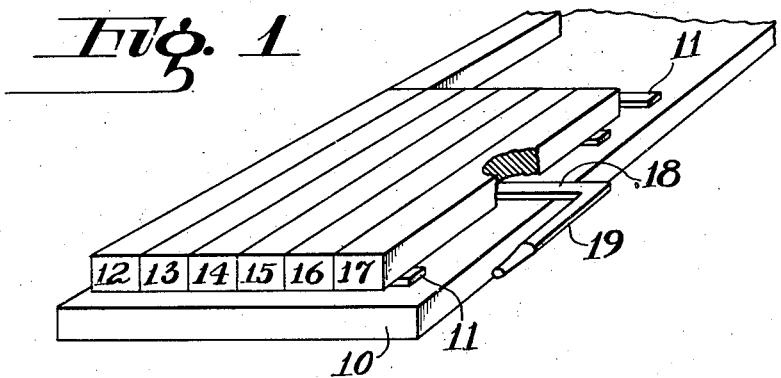
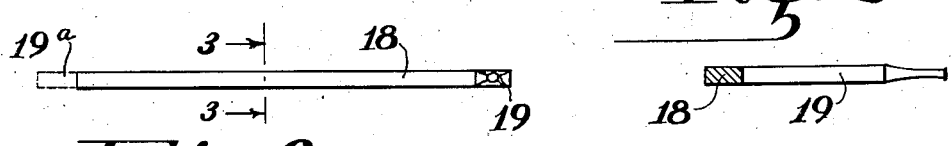
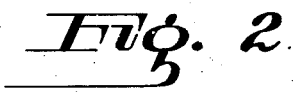
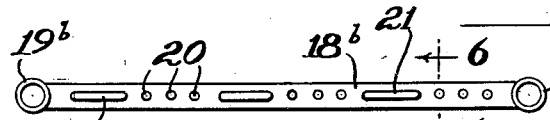
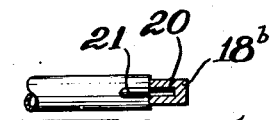
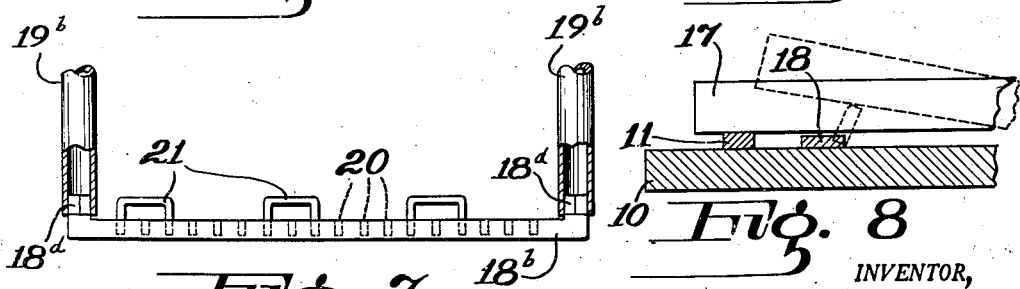
INVENTOR,
Gustave A. Swenson
BY
Church & Church
his ATTORNEYS Patented Mar. 8, 1949

2,464,103

UNITED STATES PATENT OFFICE 2,464,103

STONE MANIPULATING IMPLEMENT

Gustave A. Swenson, Bloomington, Ind.

Application December 17, 1946, Serial No. 716,815

4 Claims. (Cl. 254—120)

This invention relates to an implement for manipulating comparatively large pieces or units of stone and particularly to an implement for lifting and shifting long pieces of marble or other stone being operated upon by stone cutting or dressing apparatus. It has been the general practice in stone working mills to use pry bars or levers of different forms for moving or shifting lengths or slabs of stone when raising the stone for the purpose of placing belting underneath the same or in shifting or feeding the stone relatively to a machine which is being used for performing a dressing or cutting operation on the stone. Such usage of pry bars and similar tools is highly disadvantageous in that it is not only time consuming but, of more importance, it frequently results in the edges or exposed faces of the stone against which the pry bar is placed being chipped and marred to an objectionable extent.

One object of the present invention, therefore, is to provide an implement with which heavy slabs or pieces of stone can be elevated or shifted with respect to a supporting surface with manimum danger of marring or chipping corners or faces of the stone.

Another object is to provide an implement with which heavy bodies of stone can be elevated or shifted quite expeditiously, particularly as compared with the old style practice of using pry bars.

Still another object is to provide a stone lifting and shifting implement of simple but sturdy design and which can be produced inexpensively.

Still another object is to provide a stone lifting and shifting implement with which one or more lengths of stone in a series of pieces of stone supported side by side can be lifted or shifted whereby when it is not necessary or desirable to shift all the stones in the series, predetermined pieces in the series can be lifted and shifted with respect to the surface on which they are supported.

With these and other objects in view, the invention consists in certain details of construction and combinations and arrangements of parts, all as will hereinafter be more fully described and the novel features thereof particularly pointed out in the appended claims.

In the accompanying drawings—

Figure 1 is a perspective view illustrating a series of stones supported by skids on a main supporting surface such as a stationary saw slab, portions of the stone being shown broken away to more fully illustrate the implement or tool itself;

Fig. 2 is a side elevational view of the tool illustrated in Fig. 1;

Fig. 3 is a sectional view on the line 3—3 of Fig. 2;

Fig. 4 is a perspective view illustrating a modified form of implement;

Fig. 5 is a side elevation of a still further modified form of implement;

Fig. 6 is a transverse sectional view on the line 6—6 of Fig. 5;

Fig. 7 is a side elevational view illustrating the tool of Fig. 5 after it has been turned through an arc of 90°; and Fig. 8 illustrates more or less diagrammatically how a stone may be lifted, or lifted and shifted, with the present implement.

In Fig. 1 a stationary saw slab such as is provided in stone working mills for supporting stone to be sawed is indicated at 10 and the lengths of stone are supported in spaced relation above the slab 10 by suitable skids 11, these skids usually being approximately an inch thick. As is common practice, a series of stones indicated at 12, 13, 14, 15, 16, and 17, are frequently arranged side by side on the skids 11 and, at times, it is desired to lift one or more or all of these stones for inserting belts or slings under the stone for removing the stone from the slab. Also, at times it is desired to shift one or more or all of them lengthwise of the slab 10 or transversely of the skids 11, for the purpose of shifting the stones with respect to the slab 10 or with respect to some stone working machine such as a saw. The present tool or implement comprises a body portion 18 which has a major and a minor cross-sectional dimension, the minor cross-sectional dimension of the tool body not exceeding the thickness of the skids 11 or the height at which the slabs of stone are supported by the skids above slab 10, so that this body portion of the tool can be slipped endwise under the stones while the latter are resting on the skids. In other words, the body of the tool should have a thickness preferably a little less than the thickness of the skids 10. On the other hand, the major cross-sectional dimension or width of the body of the tool is greater than the space between the slab 10 and the skid supported stone slabs so that when the body of the tool is rotated to turn it edgewise with respect to the slab 10 those stones under which the tool body is positioned will be elevated. Various means may be provided for thus rotating the tool body, the tool illustrated in Figs. 1 to 3 having an integral handle portion 19 formed at one end thereof. If desired, a second handle may also be provided at the opposite end as indicated in dotted lines at 19ᵃ in Fig. 2, the handles lying in the plane of the body 18 to facilitate placing the implement under the stone. Also, separable operating handles may be provided, as shown in Figs. 5 to 7, wherein tubular handles 19ᵇ have a telescoping fit with the ends 18ᵈ of the tool body 18ᵇ. The handles may be of any desired length and are provided at both ends of the tool body in those instances where the total weight of a plurality of stones to be moved may be such as to require the application of turning forces to both ends of the tool body. In other words, where a series of stones arranged side by side or on top of each other are to be lifted with the implement the weight involved may be such as to preclude turning of the tool body by only one individual.

In addition to being capable of elevating a stone or stones as thus described, the present tool is also capable of shifting the stones lengthwise of the slab 10 by reason of the fact that its body portion is of angular cross-section so that when it is rotated one of the corners of the tool body will catch or grip against the under surface of the stone with more or less of a biting action, so that, by continued rotation of the operating handle and tool body, the stone or stones under which the tool is positioned can be shifted lengthwise, as shown in Fig. 8. That is, when the body of the tool 18 is rotated from its flat position, as shown in full lines in Fig. 8, to the position shown in dotted lines in said figure, the slab 17 of stone will have been moved from the position shown in full lines to the position shown in dotted lines.

Where the tool is designed for lifting or shifting a number of stones positioned side by side, as shown in Fig. 1, the body 18 is made of sufficient length to engage all of the stones but the invention also contemplates provision of an implement for manipulating only one stone at a time. Such an implement is shown in Fig. 4 where the body 18ᵃ is only long enough to engage a single stone.

In the modified form of implement shown in Figs. 5 to 7, the body 18ᵇ of the implement is provided with a series of equi-distantly spaced holes 20 in one side thereof in which there can be removably inserted U-shaped stone engaging members 21, the length of these members 21 being such that the ends of the member will be spaced apart a distance corresponding to the distance between three or more of the holes 20. In the present instance the length of the members 21 is such that the ends or legs of each member are spaced apart a distance to span three holes in the body of the implement. As in the first described form of implement, the thickness of the body portion 18ᵇ is such that it can be inserted flatwise beneath the skid supported stones but the over-all cross-sectional dimension of the implement, that is the width of the body 18ᵇ plus the distance the members 21 project laterally therefrom, is greater than the width of the space beneath the slabs of stone so that when the tool is inserted beneath the stones and rotated those stones which are engaged by the member 21 will be lifted or shifted, depending upon the extent to which the body of the implement is rotated. It will be understood that the members 21 can be positioned at any point desired lengthwise of the body of the tool, depending upon the particular stone or stones it is desired to lift or shift. In other words, if it is desired to lift or shift a single stone or only a portion of a series of stones supported on the skids 11 one or more members 21 would be inserted in the body of the implement at points to engage only those stones it is desired to shift. On the other hand, of course, if all of the stones in a series of stones are to be shifted the number of members 21 necessary to accomplish this end would be inserted in the tool body.

From the foregoing it will be seen that the present tool is of sturdy and economical construction and that the use of the same in lifting or turning the stones will preclude damaging particularly the corners of the stones. A further advantage of the specific form of tool shown in Figs. 5 to 7 is that one or more stones in a series of stones can be shifted or lifted independently of other stones in the series.

What is claimed is:

1. An implement for lifting and shifting stone supported by skids in spaced relation above a main supporting surface, said implement comprising an elongated body having a series of holes in one side thereof, the thickness of said body transversely of said holes not exceeding the space between the stone and said supporting surface whereby said body can be inserted lengthwise and flat-wise in said space beneath the stone, and means removably secured in said holes and projecting from said side of the body, the overall dimension of said body and means projecting from the body exceeding the height of the space beneath the stone whereby said means will engage and lift the stone when the body is rotated on a longitudinal axis.

2. An implement for lifting and shifting stone supported by skids in spaced relation above a main supporting surface, said implement comprising an elongated body having a series of holes in one side thereof, the thickness of said body transversely of said holes not exceeding the space between the stone and said supporting surface whereby said body can be inserted lengthwise and flat-wise in said space beneath the stone, said holes being equi-distantly spaced longitudinally of the body, a U-shaped member having its ends spaced apart a distance corresponding to the distance between two or more of said holes whereby the ends of said member can be inserted in predetermined holes in said body, the overall dimension of said body and said member when the latter is mounted in the body exceeding the height of the space beneath the stone, and means for rotating said body on a longitudinal axis.

3. An implement for lifting and shifting stone supported by skids in spaced relation above a main supporting surface, said implement comprising an elongated body having a series of holes in one side thereof, the thickness of said body transversely of said holes not exceeding the space between the stone and said supporting surface whereby said body can be inserted lengthwise and flat-wise in said space beneath the stone, said holes being equi-distantly spaced longitudinally of the body, a plurality of U-shaped members removably mounted in the said holes and spaced longitudinally of said body in a relationship depending upon the lateral spacing of the stones to be lifted from said skids, and means for rotating said body on an axis extending longitudinally thereof.

4. An implement for lifting and shifting a selected one of several parallel lengths of stone supported by skids in spaced relation to a main supporting surface, said implement comprising a body portion of uniform polygonal cross-section having major and minor cross-sectional dimensions with the minor cross-sectional dimensions less than the height of the space between the stone and supporting surface to permit insertion of the body lengthwise and flatwise beneath the stone and said major cross-sectional dimension extending the height of said space, said body portion having a rectangular longitudinal section of a width corresponding to said minor dimension of said polygonal cross-section and a length corresponding to the width of a single length of stone, whereby any selected one of the parallel lengths of stone will be lifted by the inserted body when the latter is turned edgewise with respect to said supporting surface, and means for rotating said body about a longitudinal axis.

GUSTAVE A. SWENSON.

REFERENCES CITED

The following references are of record in the file of this patent:

UNITED STATES PATENTS

| Number | Name | Date |
| --- | --- | --- |
| 1,023,775 | Willson | Apr. 16, 1912 |
| 1,494,951 | Cragun | May 20, 1924 |

OTHER REFERENCES

Popular Mechanics, February 1943, page 126.